(12) United States Patent
Weintraub (10) Patent No.: US 9,286,894 B1
(45) Date of Patent: Mar. 15, 2016

(54) PARALLEL RECOGNITION

(71) Applicant: Google Inc., Mountain View, CA (US)

(72) Inventor: Mitchel Weintraub, Cupertino, CA (US)

(73) Assignee: Google Inc., Mountain View, CA (US)

( * ) Notice: Subject to any disclaimer, the term of this patent is extended or adjusted under 35 U.S.C. 154(b) by 472 days.

(21) Appl. No.: 13/755,070

(22) Filed: Jan. 31, 2013

Related U.S. Application Data (60) Provisional application No. 61/592,836, filed on Jan. 31, 2012.

(51) Int. Cl.
| | |
|---|---|
| G10L 21/00 | (2013.01) |
| G10L 15/22 | (2006.01) |
| G10L 15/32 | (2013.01) |

(52) U.S. Cl.
CPC ............... *G10L 15/22* (2013.01); *G10L 15/32* (2013.01)

(58) Field of Classification Search
CPC ................................. G10L 15/32; G10L 15/34
See application file for complete search history.

(56) References Cited

U.S. PATENT DOCUMENTS

| | | | | |
|---|---|---|---|---|
| 4,980,917 | A * | 12/1990 | Hutchins | 704/254 |
| 5,148,489 | A | 9/1992 | Erell et al. | |
| 5,212,730 | A | 5/1993 | Wheatley et al. | |
| 5,459,798 | A * | 10/1995 | Bailey et al. | 382/218 |
| 5,537,444 | A * | 7/1996 | Nill et al. | 375/341 |
| 5,822,727 | A | 10/1998 | Garberg et al. | |
| 5,825,921 | A * | 10/1998 | Dulong | 382/181 |
| 6,016,470 | A | 1/2000 | Shu | |
| 6,230,128 | B1 * | 5/2001 | Smyth | 704/236 |
| 6,272,464 | B1 | 8/2001 | Kiraz et al. | |
| 6,694,055 | B2 | 2/2004 | Wu | |
| 7,206,363 | B2 * | 4/2007 | Hegde et al. | 375/341 |
| 7,587,319 | B2 * | 9/2009 | Catchpole | 704/235 |
| 2002/0133346 | A1 * | 9/2002 | Kemble et al. | 704/257 |
| 2005/0044474 | A1 * | 2/2005 | Zaboronski et al. | 714/794 |

(Continued)

FOREIGN PATENT DOCUMENTS

| | | |
|---|---|---|
| EP | 0 661 690 | 7/1995 |
| EP | 1 693 828 | 1/2008 |

OTHER PUBLICATIONS

Bechet et al., "Very Large Vocabulary Proper Name Recognition for Directory Assistance", IEEE Automatic Speech Recognition and Understanding Workshop—Dec. 9-13, 2001—Madonna di Campiglio (Italy).

(Continued)

*Primary Examiner* — Brian Albertalli
(74) *Attorney, Agent, or Firm* — Fish & Richardson P.C.

(57) ABSTRACT

Recognition techniques may include the following. On a first processing entity, a first recognition process is performed on a first element, where the first recognition process includes: in a first state machine having M (M>1) states, determining a first best path cost in at least a subset of the M states for at least part of the first element. On a second processing entity, a second recognition process is performed on a second element, where the second recognition process includes: in a second state machine having N (N>1) states, determining a second best path cost in at least a subset of the N states for at least part of the second element. At least one of the following is done: (i) passing the first best path cost to the second state machine, or (ii) passing the second best path cost to the first state machine. The foregoing techniques may include one or more of the following features, either alone or in combination.

20 Claims, 5 Drawing Sheets

(56) References Cited

U.S. PATENT DOCUMENTS

| | | | | |
|---|---|---|---|---|
| 2008/0120094 | A1* | 5/2008 | Mate et al. | 704/201 |
| 2008/0243506 | A1* | 10/2008 | Sakai et al. | 704/256.4 |
| 2009/0012792 | A1 | 1/2009 | Low et al. | |
| 2010/0004930 | A1* | 1/2010 | Strope et al. | 704/240 |
| 2011/0166855 | A1* | 7/2011 | Vermeulen et al. | 704/231 |

OTHER PUBLICATIONS

Chung et al., "A Parallel Phoneme Recognition Algorithm Based on Continuous Hidden markov Model", [online] Retrieved from the Internet [retrieved on Feb. 5, 2013] at URL:<http://ipdps.cc.gatech.edu/1999/papers/173.pdf>, (IPPS '99/SPDP '99), IEEE Computer Society Washington, DC, USA (1999).

De Mori, R. and Brugnara, F., "HMM Methods in Speech Recognition", [online] Retrieved from the Internet [retrieved on Feb. 5, 2013] at URL:<http://www.cslu.ogi.edu/HLTsurvey/ch1node7.html>, (1997).

Juang, B. H. and Rabiner, L. R., "Hidden Markov Models for Speech Recognition", Technometrics, vol. 33, No. 3. (Aug. 1991), pp. 251-272, [online] Retrieved from the Internet [retrieved on Feb. 5, 2013] at URL<http://luthuli.cs.uiuc.edu/~daf/courses/Signals%20Al/Papers/HMMs/0.pdf>, (1991).

Melnikoff et al., "Implementing a Hidden Markov Model Speech Recognition System in Programmable Logic", 11th International Conference on Field Programmable Logic and Applications (FPL 2001), [online] Retrieved from the Internet [retrieved on Feb. 5, 2013] at URL:< http://eprints.bham.ac.uk/25/1/Melnikoff01FPL.pdf>, (2001).

Phillips, S. & Rogers, A., "Parallel Speech Recognition", International Journal of Parallel Programming, vol. 27(4), Kluwer Academic Publishers, Norwell, MA, USA (Aug. 1999).

Rabiner, L., "A Tutorial on Hidden Markov Models and Selected Applications in Speech Recognition", Proc. IEEE, v. 77(2), [online] Retrieved from the Internet [retrieved on Feb. 5, 2013] at URL:<http://www.cs.cornell.edu/Courses/cs4758/2012sp/materials/hmm_paper_rabiner.pdf>, (Feb. 1989).

Wikipedia page for "Hidden Markov Model", [online] Retrieved from the Internet [retrieved on Feb. 5, 2013] at URL:< http://en.wikipedia.org/wiki/Hidden_Markov_model>, ( circa 2002).

* cited by examiner

PARALLEL RECOGNITION

CROSS-REFERENCE TO RELATED APPLICATION

Priority is hereby claimed to U.S. Provisional Application No. 61/592,836, which was filed on Jan. 31, 2012. The contents of U.S. Provisional Application No. 61/592,836 are hereby incorporated by reference into this disclosure.

BACKGROUND

This disclosure relates to performing recognition processes in parallel.

A state machine may be used to recognize an unknown input, examples of which include speech, handwriting, and optical character(s). In the speech recognition example, a state machine determines a sequence of known states representing sounds that that best matches input speech. This best-matched sequence is deemed to be the state machine's hypothesis for transcription of the input speech.

During the speech recognition process, each state in the state machine receives the best incoming path to that state (e.g., the incoming path with the lowest cost), determines how good a match incoming audio is to itself, produces a result called the "state matching cost", and outputs data corresponding to this result to successor state(s). The combination of state matching costs with the lowest cost incoming path is referred to as the "path cost". The path with the lowest path cost may be selected as the best-matched sequence for the input speech.

In parallel recognition systems, the states of a state machine are distributed across a set of parallel processing entities (e.g., computers). However, in such systems, if any one processing entity lags, processing performed by other entities, which depends on that entity's output, is delayed. As a result, there is a delay in determining the best-matched sequence for the input speech.

SUMMARY

This disclosure describes systems and techniques for performing recognition processes in parallel, e.g., on different computers. The recognition processes may include, but are not limited to, speech recognition processes, handwriting recognition processes, and optical character recognition processes.

Described herein are techniques that include the following. On a first processing entity, a first recognition process is performed on a first element, where the first recognition process includes: in a first state machine having M (M>1) states, determining a first best path cost in at least a subset of the M states for at least part of the first element. On a second processing entity, a second recognition process is performed on a second element, where the second recognition process includes: in a second state machine having N (N>1) states, determining a second best path cost in at least a subset of the N states for at least part of the second element. At least one of the following is done: (i) passing the first best path cost to the second state machine, or (ii) passing the second best path cost to the first state machine. The foregoing techniques may include one or more of the following features, either alone or in combination.

The first recognition process and the second recognition process may be performed in parallel. The first recognition process may include a speech recognition process and the second recognition process may include a speech recognition process. The first element may include a first word, and the at least part of the first element may include first phonemes that make up the first word. The second element may include a second word, and the at least part of the second element may include second phonemes that make up the second word. Each of the first phonemes may correspond to more than one of the M states; and each of the second phonemes may correspond to more than one of the N states.

The first recognition process may include a character recognition process and the second recognition process may include a character recognition process. The first recognition process may include a handwriting recognition process and the second recognition process may include a handwriting recognition process.

The first processing entity may be associated with a first memory, and the techniques may include storing the first best path cost in the first memory. The second processing entity may be associated with a second memory, and the techniques may include storing the second best path cost in the second memory.

The subset of M states may include M−1 states, and a best path cost for first of the M states may be indeterminate until an input is received from external to the first processing entity; or the subset of N states may include N−1 states, and a best path cost for a first of the N states may be indeterminate until an input is received from external to the second processing entity. The input to the first of the M states may be the second best path cost, or the input to the first of the N states may be the first best path cost.

The techniques may also include receiving the first word and the second word from a mobile computing device; and performing an action in response to recognition of the first word and the second word.

Also described herein are parallel recognition techniques that include performing speech recognition processes on different computers, where the speech recognition processes are for recognizing different portions of an audio signal, and the speech recognition processes are performed in parallel; and providing an output of one of the speech recognition processes as an input to another one of the speech recognition processes. The foregoing techniques may include one or more of the following features, either alone or in combination.

Each speech recognition process may include a state machine that has states, and each of the speech recognition processes may include determining a best path cost in at least a subset of states of the state machine for a different portion of the audio signal. Each different portion of the audio signal may be a word included in speech made up of multiple words.

Two or more of the features described in this disclosure, or portions thereof, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system for performing recognition processes, e.g., speech recognition, in parallel. In the case of speech recognition for example, separate processing entities (e.g., computers) may perform speech recognition on two words in a sentence. For example, in a spoken phrase, e.g., "recognize speech", one processing entity may perform a process to compare the word "recognize" with the incoming audio. A different processing entity may perform a process to compare the word "speech" with the incoming audio.

In an example scenario, the word "recognize" is one-half a second long, and the second word "speech" is also one-half second long. The first half second of audio (which includes the word "recognize") is sent to two processing entities for processing in parallel. A first processing entity compares the input audio to its model for the word "recognize" and finds an acceptable match. The second processing entity compares the input audio (for the word "recognize") to its model for the word "speech", and find an unacceptable match. If such processing were being performed by a single processing entity, that single processing entity would compare the first one-half second of audio to the states representing "recognize", and then compare that same one-half second of audio to the states representing "speech". In the parallel recognition system described herein, that processing can be split among multiple (e.g., two) processing entities and performed in parallel.

After processing the first one-half second of speech, the second one-half second of speech is processed. The audio for "speech" is sent to the first processing entity, where it is determined that the audio is not an acceptable match for "recognize". The audio is also sent to the second processing entity, where it is determined that the audio is an acceptable match for the word "speech". As described in more detail below, these processes may be performed in parallel in order to reduce the overall time that it takes to recognize the input speech.

Each recognition process may employ a state machine that includes at least one state. Each recognition process determines path costs through subsets of states in its respective state machine where those path costs can be determined. For example, as described below, the input to a state machine may be the output of a prior state machine. In the case above, for example, an input to the state machine for "speech" may be the output of the state machine for "recognize". A path in a state machine relies upon the knowledge of path costs arriving at the current state in order to determine the best path cost. Without knowledge of the prior path costs, the best incoming path cost cannot be determined, nor can the output path cost for this state be determined. This knowledge generally cannot be determined until the appropriate information from the prior states are obtained.

However, other paths in the state machine, which do not rely on input from the prior state machine, can be checked without the input from the prior state machine. For other states in that state machine where incoming path costs are known, it is possible to determine the best incoming path cost and the best outgoing path cost for this state. Therefore, according to the parallel recognition processes described herein, the incoming paths to various states are checked in parallel, and states that have incoming path costs that are known can update their costs in parallel. Thereafter, best paths and best path costs are exchanged between state machines (e.g., between entities performing the recognition processes), and the paths of the state machines that rely on inputs from other state machines are checked. By checking, in parallel, paths of state machines that do not require external inputs before such inputs are received, the parallel recognition system is less sensitive to delays caused by parallel processing entities.

Accordingly, in an example implementation, a "path" includes a sequence of states through a state machine that are compared to an input audio signal. A "path cost" includes a sum of matching costs (e.g., costs of matching a state to a segment of audio) and transition costs (costs to transition from a state_i to a state_j). A "best path cost" includes the "path" with the lowest "path cost". A state in a state machine may have several different states that can transition to the current state. To determine the "best input path" leading into a state, the "path cost" for each path arriving at a current state should be known. If any of the incoming "path costs" are unknown at the current time, then the "best path cost" for this state cannot be determined until incoming path costs become known.

As noted above, the parallel recognition system described herein is not limited to use with speech recognition, but rather can be employed in any recognition process. Therefore, although the following description focuses on speech recognition, the system is not limited to use in a speech recognition context.

Figure 1:
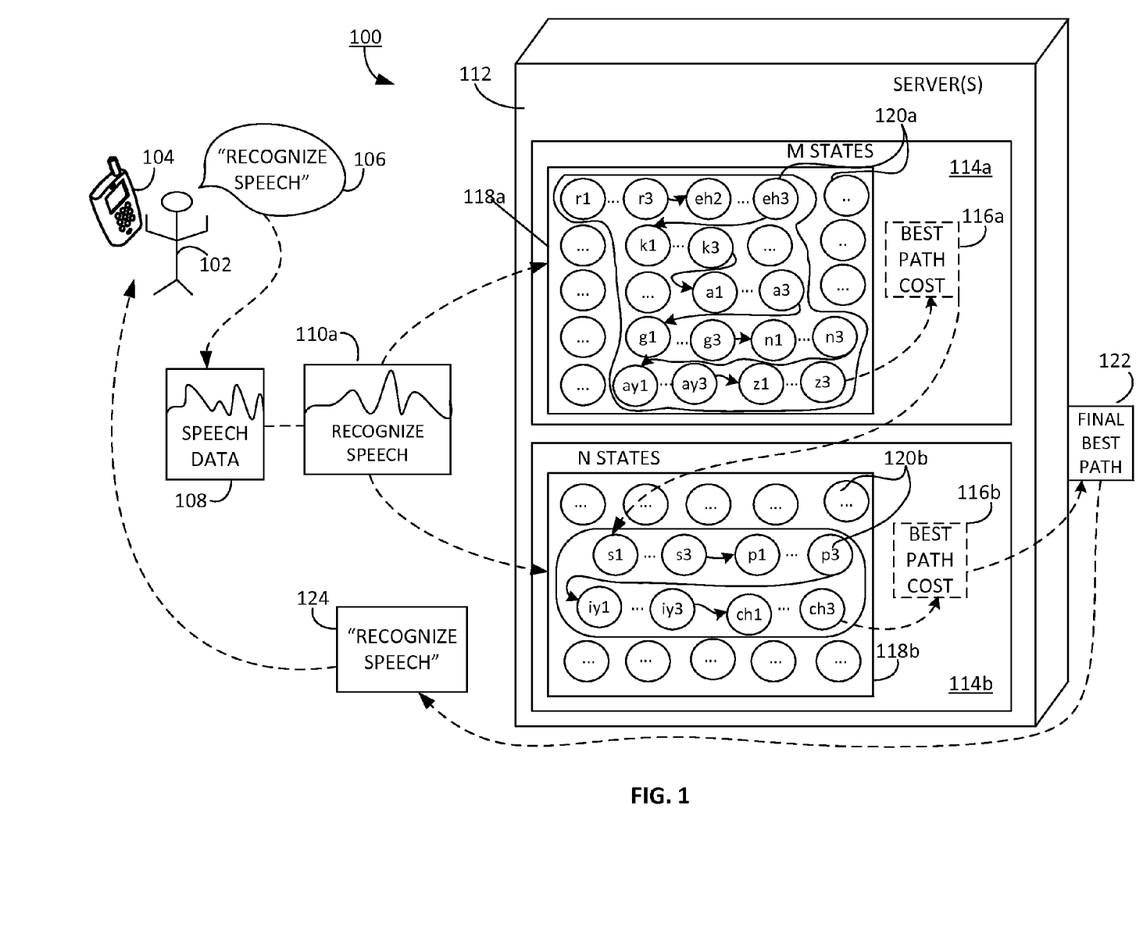
FIG. 1 is a conceptual view of an example system for performing speech recognition in parallel.

FIG. 1 is a conceptual view of an example system for performing speech recognition in parallel The system may be implemented, e.g., by code executed, in parallel, on two or more processing entities. Examples of such entities include, but are not limited to, computers or other processing devices (e.g., microprocessors) communicatively coupled directly or through a distributed network, multiple processing devices within a single computer, multiple cores within a single processing device, different virtual machines executing on the same processing device, and so forth.

Each processing entity (or simply, "entity") is configured to perform a speech recognition process on an audio element in parallel with other processing entity(ies). The audio element may be a part of a word, phoneme, etc; the audio element can be a whole word, phoneme, etc.; the audio element can be a part of a sequence of words, phonemes, etc., and so forth. After an entity has completed a current speech recognition process, the entity may communicate resulting path cost information to other entities in the system. The path cost information may be indicative of, e.g., the most likely sequence of matching states in a state machine to input speech. This path cost information may be transmitted in different ways. For example, each processing entity may transmit its path cost information to a central processing entity, which relays the information to other entities. In the absence of a central processing entity, processing entities may individually transmit their path cost information directly to other entities, e.g., in a parallel computing system.

Referring to FIG. 1, a user 102 utters input speech 106, e.g., the phrase "recognize speech", into a communication device 104, which may be a cellular telephone, a personal computer, a tablet or personal digital assistant (PDA), or any other type of electronic device that uses a microphone input. Communication device 104 converts input speech 106 into speech data 108. Input speech data 106 is audio that is a continuous stream that is sent from the microphone to various parallel processing entities. The processing entities, when performing speech recognition, identify which part the audio matches which words, if any. Audio element 110a "recognize speech" is sent to processing entity 114a and that same audio element "recognize speech" is sent to processing entity 114b. Each processing entity 114a, 114b performs a separate speech recognition process on the received audio element "recognize speech". These speech recognition processes are performed in parallel, as described in more detail below.

The speech recognition processes performed by processing entities 114a, 114b employ state machines 118a, 118b that include states 120a, 120b. In this example, these states may represent sub-phonemes in the English language. In an example implementation, a phoneme is the smallest piece of sound that provides meaningful distinctions between different words in one or more languages (e.g., every word has a sequence of phonemes). In FIG. 1's example, the acoustic data of phonemes are further broken down into smaller components called sub-phonemes, which can facilitate more accurate speech recognition (since smaller units of sound are recognized). At the end of a recognition process, a state machine 118a, outputs best path cost 116a to state machine 118b, which corresponds to a sequence of sub-phonemes that best matches the corresponding input audio element. At the end of a recognition process, a state machine 118b, outputs best path cost 116b and the corresponding best path. The better the match is between an audio element and a sequence of sub-phonemes, the smaller the resulting path cost is. Therefore, the best path cost corresponds to the sequence of sub-phonemes which has the smallest path cost.

In the example of FIG. 1, processing entity 114a includes a state machine 118a with M states 120a, where M≥1; and processing entity 114b includes a state machine 118b with N states 120b, where N≥1. The state machines in each processing entity may include similar states, the same states, or different states.

In this example, audio element, "recognize", can be broken-down into the following set of sub-phonemes: r-r-r-eh-eh-eh-k-k-k-ao-ao-ao-g-g-g-n-n-n-ay-ay-ay-z-z-z, which are labeled as follows: r1, r2, r3, eh1, eh2, eh3, k1, k2, k3, ao1, ao2, ao3, g1, g2, g3, n1, n2, n3, ay1, ay2, ay3, z1, z2, z3. In this example, audio element 110a, "speech", can be broken-down into the following set of sub-phonemes: s-s-s-p-p-p-iy-iy-iy-ch-ch-ch, which are labeled as follows: s1, s2, s3, p1, p2, p3, iy1, iy2, iy3, ch1, ch2, ch3. Each state machine 118a and 118b, therefore, should ultimately find the best path to be the following sequence of sub-phoneme states: r1, r2, r3, eh1, eh2, eh3, k1, k2, k3, ao1, ao2, ao3, g1, g2, g3, n1, n2, n3, ay1, ay2, ay3, z1, z2, z3 s1 s2, s3, p1, p2, p3, iy1, iy2, iy3, ch1, ch2, ch3.

In this example, processing entities 114a and 114b perform, in parallel, a speech recognition process on audio element "recognize". In this context, parallel processing may include at least some, although not necessarily all, processing being performed at the same time. When both processing entities 114a and 114b have completed processing, each proceeds to recognize "speech" in parallel.

In this example, first processing entity 114a compares the input audio to its model for the word "recognize" and finds an acceptable match. Second processing entity 114b compares the input audio (for the word "recognize") to its model for the word "speech", and find an unacceptable match. After processing the first one-half second of speech, the second one-half second of speech is processed. The audio for "speech" is sent to first processing entity 114a, where it is determined that the audio is not an acceptable match for "recognize". The audio is also sent to second processing entity 114n, where it is determined that the audio is an acceptable match for the word "speech". In this example, second processing entity 114b will use the best path cost and word match (e.g., "recognize") from first processing entity 114a to perform its recognition of audio input "speech".

More specifically, recognition of sub-phoneme s1 for the "s" in "speech" uses the output (e.g., best path cost 116a and word match) of the recognition process performed by processing entity 114a. However, recognition of sub-phoneme s1 cannot occur until best path cost 116a and a word match is received from processing entity 114a. Nevertheless, recognition processing may be performed for the remaining sub-phonemes in "speech", namely s2, s3, p1, p2, p3, iy1, iy2, iy3, ch1, ch2, ch3 while processing entity 114b awaits receipt of input from processing entity 114a. When the best path cost 116a and word match for "recognize" is received from processing entity 114a, that information is used to recognize sub-phoneme s1, and thereby complete the recognition process for "speech", e.g., determine the final best path 122 and word match for the phrase "recognize speech". In more detail, the best path cost output by processing entity 114a, which corresponds to the sequence of sub-phonemes that form the word "recognize", is sent as an input into the state machine 118b of processing entity 114b. From there, state machine 118b determines final best path 122 to be one which traverses the sub-phoneme states 120a that match audio element 110a "recognize" and continues through the sequence of sub-phoneme states 120b that match the audio element "speech".

The final best path corresponds to the sequence of sub-phonemes that has the lowest path cost. Words corresponding to the final best path 122 may be converted into a textual transcription 124 and sent back to communication device 104. This transcription 124 should match initial input speech 106.

Figure 2:
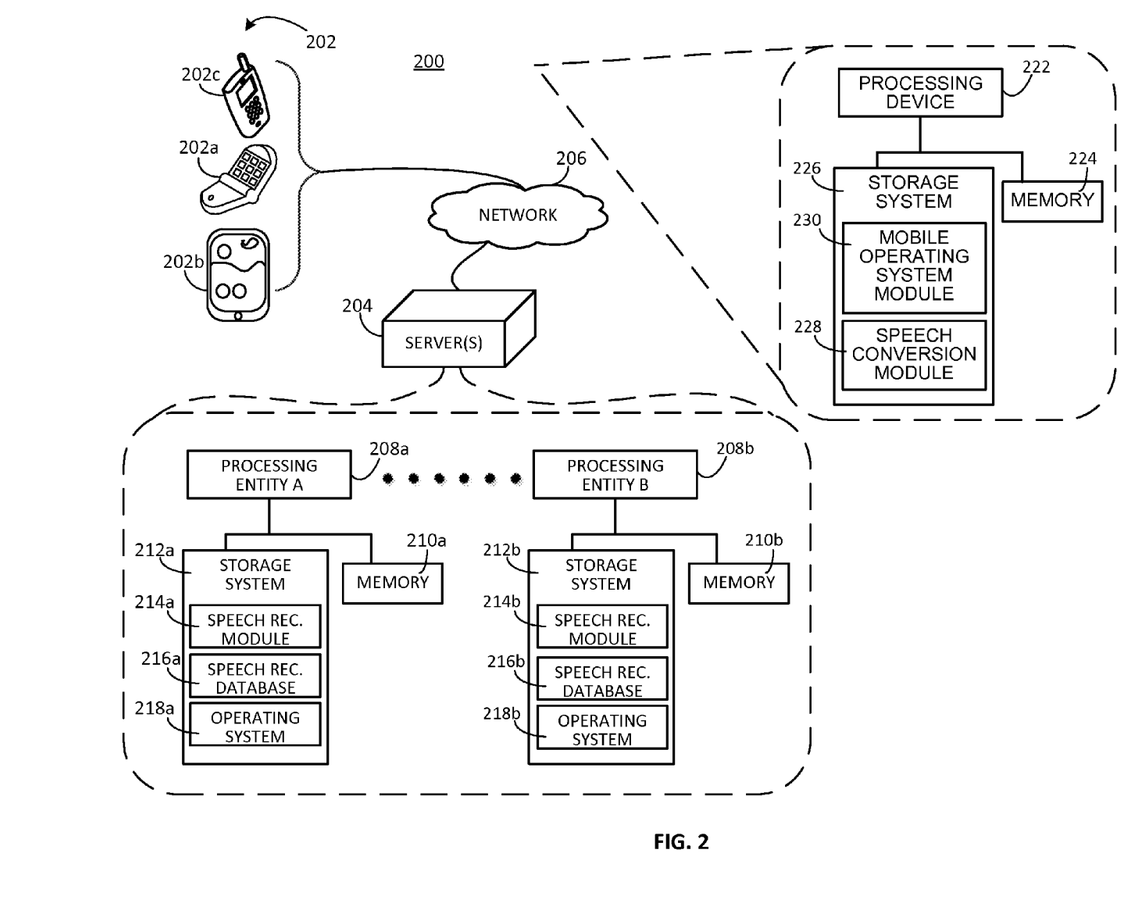
FIG. 2 is a block diagram of an example of a system on which the process of FIG. 1 may be implemented.

FIG. 2 is a block diagram of an example of a system 200 on which the process of FIG. 1 may be implemented. For example, input speech 106 may be provided through one of communication devices 202. Resulting speech data 108 may be transmitted to one or more processing entities (e.g., processing entities 208a and 208b or more), which may be part of server(s) 204, for parallel speech recognition, as described herein.

Communication devices 202 may communicate with server(s) 204 through network 206. Network 206 can represent a mobile communications network that can allow devices (e.g., communication devices 202) to communicate wirelessly through a communication interface (not shown), which may include digital signal processing circuitry where necessary. Network 206 can include one or more networks available for use by communication devices 202 for communication with server(s) 204. The network(s) may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, e.g., using a Bluetooth, WiFi, or other such transceiver.

Communication devices 202 can include various forms of client devices and personal computing devices. Communication devices 202 can include, but are not limited to, a cellular telephone 202*a*, personal digital assistant (PDA) 202*b*, and a smartphone 202*c*. In other implementations, communication devices 202 may include (not shown), personal computing devices, e.g., a laptop computer, a handheld computer, a desktop computer, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the personal computing device can be included as part of a motor vehicle (e.g., an automobile, an emergency vehicle (e.g., fire truck, ambulance), a bus).

Communication devices 202 may each include one or more processing devices 222, memory 224, and a storage system 226. Storage system 226 can include a speech conversion module 228 and a mobile operating system module 230. Each processing device 222 can run an operating system included in mobile operating system module 230 to execute software included in speech conversion module 228. Referring to both FIG. 2 and FIG. 1, speech conversion module 228 may receive input speech 106 and perform any processing necessary to convert the input speech 106 into data 108 for recognition.

Server(s) 204 can include various forms of servers including, but not limited to, a web server, an application server, a proxy server, a network server, a gateway, or a server farm. Server(s) 204 can include two or more processing entities 208*a*, 208*b*. Although only two processing entities are shown, any number may be included in system 200. In this example, each entity 208*a*, 208*b* includes a memory 210*a*, 210*b* and a storage system 212*a*, 212*b*. Processing entities 208*a*, 208*b* can be real (e.g., different computers, processors, programmed logic, a combination thereof, etc.) or virtual machines, which can be software implementations of machines that execute programs like physical machines. Each storage system 212*a*, 212*b* can include a speech recognition module 214*a*, 214*b*, a speech recognition database 216*a*, 216*b*, and a server operating system module 218*a*, 218*b*. Each processing entity 208*a*, 208*b* can run an operating system included in the server operating system module 218*a*, 218*b* to execute software included in the speech recognition module 214*a*, 214*b* in order to recognize and to identify speech data sent to server(s) 204 by a communication device.

In this regard, each speech recognition module 214*a*, 214*b* can process received speech data from a communication device 202 (e.g., cellular telephone 202*a*) and use speech recognition database 216*a*, 216*b* to determine the spoken word content of the speech data. For example, speech recognition database 216*a*, 216*b* can include general word entries (e.g., a word dictionary), each corresponding to a sequence of phonemes usable with the state machines. This word-to-phoneme correspondence can be one component of a system that is used to determine the spoken words in speech data 108.

Speech recognition module 214*a*, 214*b* may be executed by a corresponding processing entity separately to identify words, or portions thereof, in parallel. More specifically, as described above, code, either in the speech recognition modules or in a gateway server (which may be part of server(s) 204), may output speech data for parallel speech recognition in the manner described herein. That code may also control transmission of information (e.g., best path cost 116*a*, 116*b* and word matches of FIG. 1) among the processing entities 208*a*, 208*b* so as to complete speech recognition processes in one or more of those processing entities 208*a*, 208*b* as described herein.

Figure 3A:
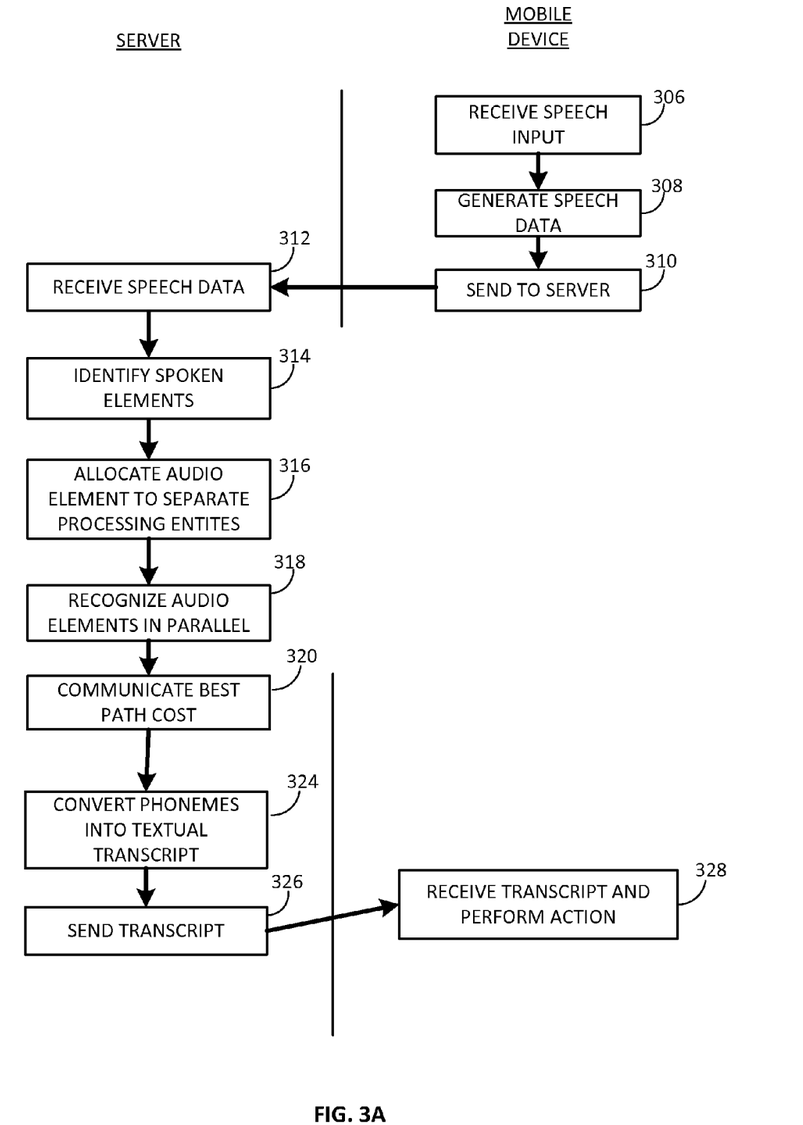
FIG. 3A is a flowchart showing an example speech recognition process.

Further details about the parallel recognition processes performed by processing entities 208*a*, 208*b* will be explained with reference to FIG. 3A, FIG. 3B, and FIG. 4. In this regard, FIG. 3A is a flowchart showing parts of the speech recognition process of FIG. 1, which may be implemented by two or more processing entities (e.g., two processing entities 208*a* and 208*b* of FIG. 2) running speech recognition modules 214*a*, 214*b*. The left portion of process 300 shows operations performed, e.g., by a server(s) 204 and the right portion of process 300 show operations performed, e.g., by a cellular phone 202*a*.

Referring to FIG. 3A, FIG. 2, and FIG. 1, cellular telephone 202*a* receives (306) input speech 106. For example, user 102 utters input speech 106, e.g., "recognize speech", into cellular telephone 202*a*. Cellular telephone 202*a* generates (308) speech data 108. Cellular telephone 202*a* may perform this generation (308) using speech conversion module 228 to convert input speech 106 "recognize speech" into speech data 108. In some implementations, speech data 108 is sent (310) to server(s) 204 through a network 206.

Server(s) 204 receive(s) (312) speech data 108. Server(s) 204 allocate(s) (316) audio element 110*a* ("recognize speech") to separate processing entities 208*a*, 208*b*. In this example, the audio element is allocated to two separate processing entities; however, in other implementations, the audio element may be allocated to more than two processing entities. The processing entities may be different physical processing entities or different virtual processing entities. Each processing entity 208*a*, 208*b* performs, in parallel, a separate recognition process (318) on audio element 110*a*. Further details about the recognition process at each processing entity 208*a*, 208*b* are provided in the description of FIG. 3B.

After at least part of the recognition process for audio element 110*a* is completed at each processing entity 208*a*, 208*b*, one or more of the best path costs 116*a*, 116*b* and word match(es) associated with each best-matched state sequence are communicated (320) to other processing entities in the parallel recognition system. For example, in FIG. 1, best path cost 116*a* is transmitted to processing entity 114*b*. This communication can occur in different ways.

In an implementation, best path cost 116*a* from processing entity 208*a* and best path cost 116*b* from processing entity 208*b* may be communicated (316) to a central processing entity (not shown), which may pass the best path costs among the processing entities. In the absence of a central processing entity, best path cost 116*a* output by speech recognition module 214*a* on processing 208*a* may be directly communicated (320) as incoming path information into speech recognition module 214*b* of processing entity 208*b*.

Speech recognition module 214*b* uses the incoming path information to determine a final best path. From there, speech recognition module 214*b* converts (324) the sequence of phonemes into a textual transcription 124. In this example, the conversion will yield the textual transcription 124 "recognize speech". Processing entity 208*b* sends (326) this transcript 124 back, e.g., to cellular telephone 202*a*, where it may be converted to audio or displayed as text.

In this regard, a communication device, e.g., cellular telephone 202a, receives (328) transcript 124. Transcript 124 may be used to perform an action. For example, cellular telephone 202a may display transcript 124 "recognize speech" on a display screen and use the text to conduct a web search. The transcribed speech may be used to control operations of the communication device. For example, the transcribed speech may be used to trigger e-mails or text messages (e.g., with recognized commands, e.g., "send e-mail" or "sent text message").

Figure 3B:
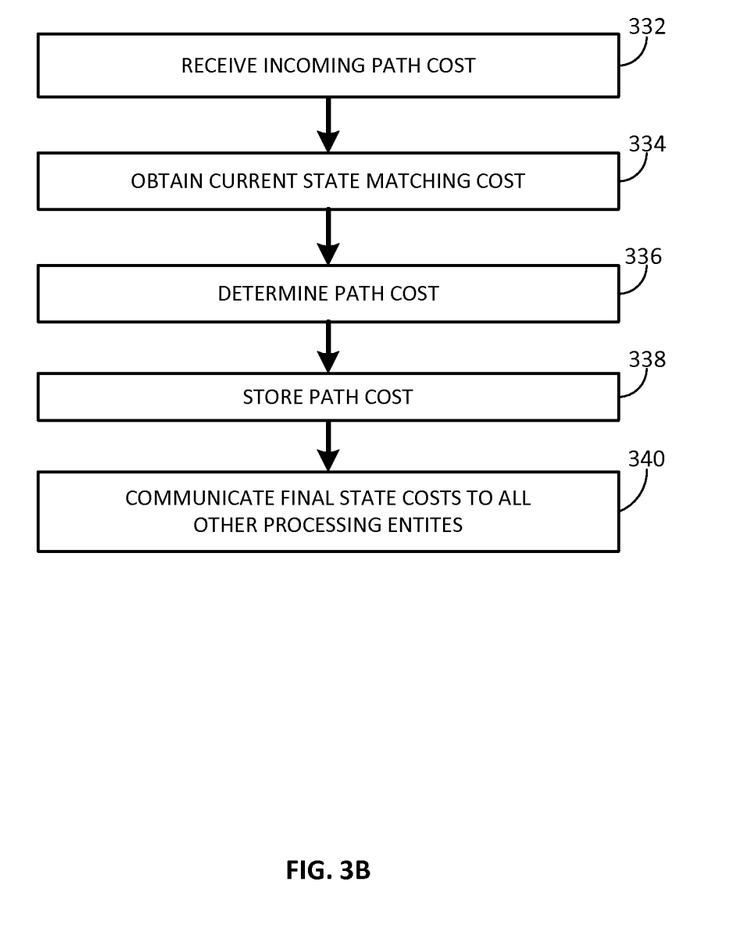
FIG. 3B is a flowchart providing an example recognition process performed by a state machine on a processing entity.

FIG. 3B is a flowchart providing an example of a recognition process performed by a state machine (e.g., state machine 118a, 118b in FIG. 1) on a processing entity (e.g., processing entity 208a, 208b in FIG. 2). For example, referring to both FIG. 2 and FIG. 1, speech recognition module 214a may perform the recognition process shown in FIG. 3B on state machine 118a and determine the best path cost 116a for audio element 110a "recognize". Performing a recognition process in parallel to processing entity 208a, processing entity 208b may perform the recognition process shown in FIG. 3B on state machine 118b and determine path costs for audio elements (e.g., phonemes) of "speech".

Referring to FIG. 3B, at the start of the first frame (e.g., $t_0$), state matching costs are initialized to positive infinity, since no part of the input speech data has yet been matched. In this regard, a "frame" of speech data constitutes a short segment of speech, e.g., 1/100th of a second of speech. A frame of speech captures both audio and feature representations of the input at a particular moment in time ("t"). Frames of audio data are passed to the processing entities, as part of a stream of frames, which use the frames to interpret the audio data.

As recognition processing continues over time, the state matching costs are updated to numerical values. At each time frame, each state in a state machine receives (332) an incoming path cost. The incoming path cost for a given state corresponds to the previous sequence of states that yielded the path cost to get to that given state. For example, referring to FIG. 1, the incoming path cost to s3 (used as the third sub-phoneme in "speech") is the cost of traversing s1, s2, and s3. Each state in the state machine also obtains (334) its current state matching cost. This may be done by determining how closely a current frame of audio matches an audio frequency at the current state. The lower the cost is, the closer the match is between the audio and the current state.

In this regard, in some cases, a state machine will not be able to determine the best path cost for an entire word because an input from a prior state machine (e.g., the immediately preceding word) is not known. Nevertheless, that state machine will perform whatever processing it can, given known information.

By way of example, referring to FIG. 1, starting with s1, recognition of sub-phoneme s1 for the "s" in "speech requires the output (e.g., best path cost 116a) of the recognition process performed on audio element 110a "recognize". Accordingly, recognition of sub-phoneme s1 is put on-hold until best path cost 116a is received. However, the remaining sub-phonemes in "speech", namely s2, s3, p1, p2, p3, iy1, iy2, iy3, ch1, ch2, ch3, can be processed. More specifically, each processing entity 114a, 114b may attempt to recognize the phrase "recognize speech". While processing entity 114a is attempting to determine path costs for r-r-r-eh-eh-eh-k-k-k-ao-ao-ao-g-g-g-n-n-n-ay-ay-ay-z-z-z, processing entity 114b may obtain path costs for the sub-phonemes in "speech" that do not require an incoming path cost, namely s2, s3, p1, p2, p3, iy1, iy2, iy3, ch1, ch2, ch3.

In this regard, each state may use its incoming path cost and its current state matching cost to determine (336) a current path cost. For example, the current path cost may be a sum, or some other combination of, the current state matching cost and the current best path cost. The path cost for each state may be stored (338) for subsequent use. Operations 332 through 338 may be performed to match input audio frames to corresponding phonemes in the state machines. The final state (e.g., a state with no further transitions) outputs the best path cost for the audio input. That is, different branches of the state machine are traversed, and the branch with the lowest path cost corresponds to the recognized audio.

Referring to FIG. 1, each processing entity communicates (340) its path cost periodically to other processing entity(ies). For example, if a time frame lasts for 10 ms, processing entity 208b (responsible for recognizing "speech") may communicate its path cost e.g., every 110 ms without receiving any known input path cost for the previous 110 ms. In this example, best path costs are communicated from final states because they serve as inputs to other state machines. For example, the best path cost and corresponding word from state machine 118a (responsible for recognizing "recognize") will serve as input to state machine 118b (responsible for recognizing "speech"). The data is sent because "recognize" can precede "speech" in a spoken request.

Figure 4:
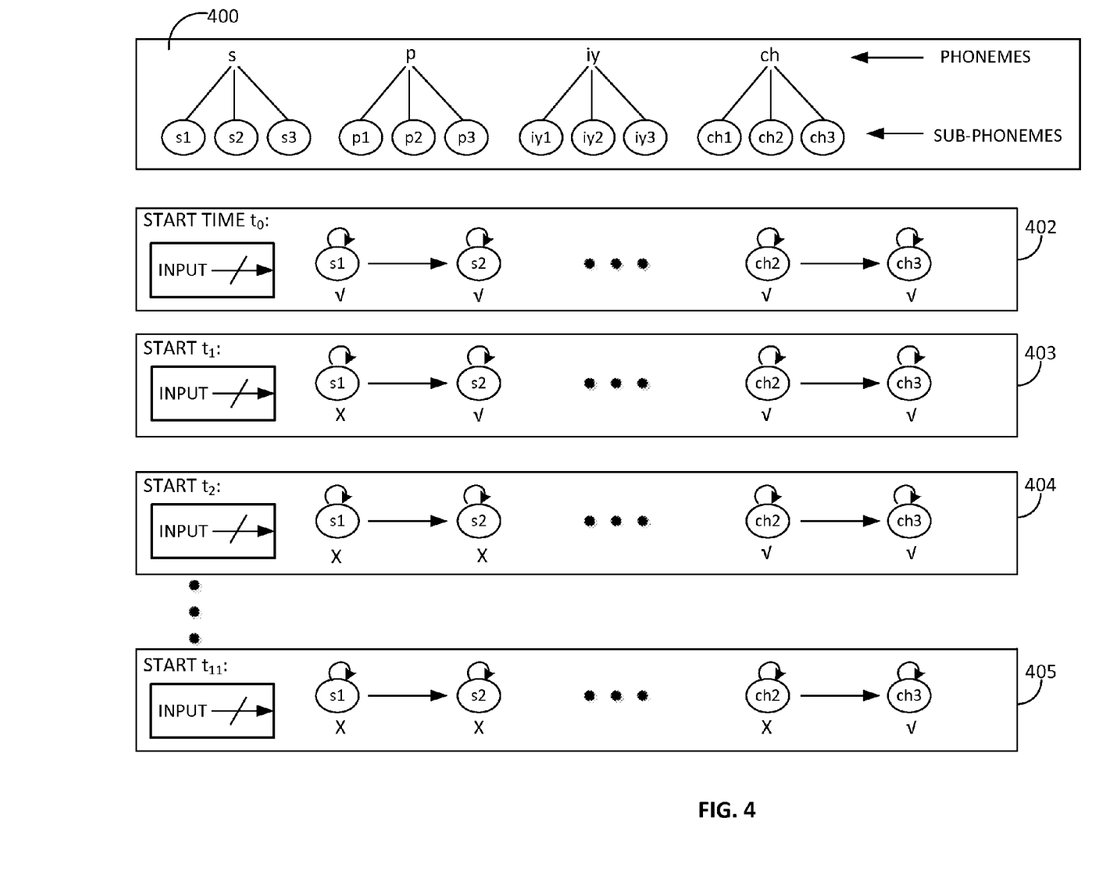
FIG. 4 illustrates an example sequence of N states that can output known path costs regardless of whether an initial input is known.

FIG. 4 illustrates graphically how a sequence of N states can output known path costs for a next N−1 time frames, regardless of whether the initial input is known. In this example, N is 12, which corresponds to the 12 sub-phonemes 400. This is known as a Hidden Markov Model (HMM). In this example, at time $t_0$, the input (e.g., incoming best path cost to the word "speech") is blocked due to communication delay. At time $t_0$, 12 state output transitions are known ("√"), since they were initialized to positive infinity at the start of the time frame. In order for a state to produce a known output for a given time frame, the state has received a known input during a previous time that the state needs to receive a known frame. Therefore, at $t_1$ 403 (i.e., start of the second time frame), the output of s1 is unknown ("x"), but the outputs of s2 through ch3 (eleven states in total) are still known ("√") because each of those states received known inputs during the previous time frame. Moving on, at $t_2$ 404, the output s2 also becomes unknown, because during the previous time frame 403, its input from s1 becomes unknown. This process of switching from a known to an unknown output upon each new time frame continues until the eleventh time frame 405. At $t_{11}$, the first eleven states (s1, s2, . . . ch2) produce unknown outputs, and the last state (ch3) still produces a known output. That means that for eleven time frames (i.e., N−1 time frames, where N is the number of sub-phoneme states in a word), the word "speech" produced known outputs regardless of whether the input into the state machine was known or not known. The path cost for these eleven frames can therefore be determined, with the final best path cost being determined when a known input is received at the state machine. Because a known output from a state machine can be produced regardless of known input into that state machine for at least N−1 (e.g., eleven) time frames, communication between processing entities only needs to occur at most once every N−1 time frames (in this example, every 110 ms, assuming a 10 ms frame). This decrease in communication frequency among processing entities may provide a time cushion for processing entities to update and determine their best path costs and to recover from communication delays.

A process similar to that described above may be used to determine the path cost for (M−1) states in a sequence of M states (e.g., for identifying "recognize").

Advantageously, the processes described herein are able to process states when the best path cost into a word is unknown.

The processes described herein are able to do this by keeping track of which states have known inputs at each time frame, and performing additional processing given the input information. When a processing entity receives new input path costs, that processing entity updates as many states as possible in view of the new information.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Content generated according to the processes described herein may be displayed on a computer peripheral (e.g., a monitor) associated with a computer, a display of a mobile device, and so forth. The display physically transforms the computer peripheral. For example, if the computer peripheral is an LCD display, the orientations of liquid crystals are changed by the application of biasing voltages in a physical transformation that is visually apparent to the user. As another example, if the computer peripheral is a cathode ray tube (CRT), the state of a fluorescent screen is changed by the impact of electrons in a physical transformation that is also visually apparent. Moreover, the display of content on a computer peripheral is tied to a particular machine, namely, the computer peripheral.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The processes described herein are not limited to the protocols described herein. For example, other communication protocols may be substituted for HTTP. For example, HTTPS, TCP, UDP, or IP communications may be used in place of HTTP communications.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method comprising:
   obtaining speech data for a particular frame representing a portion of an utterance;
   providing the speech data to multiple processors that are configured to process the speech data in parallel, each of the multiple processors being assigned to evaluate a different set of path segments in a network of states;

before the multiple processors receive speech data for future frames that occur after the particular frame and represent subsequent portions of the utterance, receiving, from the multiple processors, cost values that represent an extent to which path segments match one or more of the future frames not yet received by the multiple processors;

communicating, among the multiple processors, the cost values that represent the extent to which path segments match the one or more of the future frames not yet received by the multiple processors; and using the communicated cost values to determine a transcription of at least a portion of the utterance.

2. The method of claim 1, wherein each of multiple processors is assigned to evaluate a distinct, predetermined subset of path segments within the network of states.

3. The method of claim 1, wherein the path segments correspond to different words, and each of the multiple processors is assigned to evaluate path segments corresponding to different words.

4. The method of claim 1, wherein receiving, from the multiple processors, cost values for path segments comprises:

before the multiple processors receive the speech data for the future frames, receiving, from each of the multiple processors, a best path cost from among the path costs for the path segments that the processor is assigned to evaluate;

wherein communicating, among the multiple processors, the cost values determined for the path segments comprises:

communicating the best path cost determined by each of the multiple processors to each of the other processors of the multiple processors.

5. The method of claim 1, wherein receiving, from the multiple processors, cost values for path segments comprises:

receiving, from each of the multiple processors, a best path cost for a path segment representing a word that is calculated to be most likely to match the utterance out of a set of words the processor is assigned to evaluate.

6. The method of claim 1, wherein individual states in the network of states represent a duration of a frame; and wherein communicating, among the multiple processors, the cost values determined for the path segments comprises:

communicating, from a particular processor of the multiple processors to the other processors of the multiple processors, a cost for a path segment comprising N states, wherein the cost is provided for use during the next N−1 of the future frames.

7. The method of claim 1, wherein individual states in the network of states represent phonemes or portions of phonemes.

8. The method of claim 1, further comprising, after communicating the cost values, deferring communication of second cost values among the multiple processors until a predetermined number of multiple future frames have been received by the multiple processors.

9. The method of claim 8, wherein one of the cost values communicated among the multiple processors corresponds to a sequence of N states;

wherein deferring communication of the second cost values among the multiple processors comprises deferring communication of the second cost values until at least N−1 future frames are received by the multiple processors.

10. The method of claim 9, wherein receiving, from the multiple processors, cost values for path segments comprises:

determining, for each of at least some of the path segments, a cost for the path segment that is independent of an incoming path cost at a first state of the path segment.

11. The method of claim 1, further comprising receiving an incoming stream of speech data of the utterance as the utterance is spoken;

wherein using the communicated cost values comprises using the communicated cost values to determine a transcription of at least a portion of the utterance while receiving the incoming stream of speech data for the utterance as the utterance is spoken.

12. One or more non-transitory machine-readable media storing instructions that, when executed by one or more computers, are operable to cause the one or more computers to perform operations comprising:

obtaining speech data for a particular frame representing a portion of an utterance;

providing the speech data to multiple processors that are configured to process the speech data in parallel, each of the multiple processors being assigned to evaluate a corresponding set of path segments in a network of states;

before the multiple processors receive speech data for future frames that occur in the utterance after the particular frame and represent subsequent portions of the utterance, receiving, from the multiple processors, cost values that represent an extent to which path segments match one or more of the future frames not yet received by the multiple processors;

communicating, among the multiple processors, the cost values that represent the extent to which path segments match the one or more of the future frames not yet received by the multiple processors; and using the communicated cost values to determine a transcription of at least a portion of the utterance.

13. The one or more non-transitory machine-readable media of claim 12, wherein each of multiple processors is assigned to evaluate a distinct, predetermined subset of path segments within the network of states.

14. The one or more non-transitory machine-readable media of claim 12, wherein receiving, from the multiple processors, cost values for path segments comprises:

receiving, from each of the multiple processors, a best path cost for a path segment representing a word that is calculated to be most likely to match the utterance out of a set of words the processor is assigned to evaluate.

15. A system comprising:

one or more computers and one or more storage devices storing instructions that are operable, when executed by the one or more computers, to cause the one or more computers to perform operations comprising:

obtaining speech data for a particular frame representing a portion of an utterance;

providing the speech data to multiple processors that are configured to process the speech data in parallel, each of the multiple processors being assigned to evaluate a corresponding set of path segments in a network of states;

before the multiple processors receive speech data for future frames that occur in the utterance after the particular frame and represent subsequent portions of the utterance, receiving, from the multiple processors, cost values that represent an extent to which path segments match one or more of the future frames not yet received by the multiple processors;

communicating, among the multiple processors, the cost values that represent the extent to which path segments match the one or more of the future frames not yet received by the multiple processors; and using the communicated cost values to determine a transcription of at least a portion of the utterance.

16. The system of claim 15, wherein each of multiple processors is assigned to evaluate a distinct, predetermined subset of path segments within the network of states.

17. The method of claim 15, wherein receiving, from the multiple processors, cost values for path segments comprises:
receiving, from each of the multiple processors, a best path cost for a path segment representing a word that is calculated to be most likely to match the utterance out of a set of words the processor is assigned to evaluate.

18. A method comprising:
obtaining, at multiple processors of different computers that are configured to cooperatively recognize speech by processing speech data in parallel, speech data indicating characteristics of a portion of an utterance that occurs during a particular time period; and before the multiple processors receive speech data for portions of the utterance that occur during future time periods that occur after the particular time period:
determining, by each of the multiple processors operating in parallel, cost values representing an extent to which respective words match portions of the utterance occurring during the future time periods;
communicating, by each of the multiple processors and over a computer network, one or more of the cost values determined by the processor; and
communicating, by each of the multiple processors, additional cost values representing the extent to which the respective words match the portions of the utterance only after a predetermined amount of time comprising multiple of the future time periods has elapsed.

19. A system comprising:
multiple processors that are physically distinct, the multiple processors being connected through a communication network; and
storage devices storing instructions that are operable, when executed by the one or more processors, to cause the one or more processors to perform operations comprising:
obtaining, at the multiple processors, speech data indicating characteristics of a portion of an utterance that occurs during a particular time period; and
before the multiple processors receive speech data for portions of the utterance that occur during future time periods that occur after the particular time period:
determining, by each of the multiple processors operating in parallel, cost values representing an extent to which respective words match portions of the utterance occurring during the future time periods;
communicating, by each of the multiple processors and over a computer network, one or more of the cost values determined by the processor; and
communicating, by each of the multiple processors, additional cost values representing the extent to which the respective words match the portions of the utterance only after a predetermined amount of time comprising multiple of the future time periods has elapsed.

20. One or more non-transitory machine-readable media storing instructions that, when executed by multiple processors, are operable to cause the multiple processors to perform operations comprising:
obtaining, at the multiple processors, speech data indicating characteristics of a portion of an utterance that occurs during a particular time period; and
before the multiple processors receive speech data for portions of the utterance that occur during future time periods that occur after the particular time period:
determining, by each of the multiple processors operating in parallel, cost values representing an extent to which respective words match portions of the utterance occurring during the future time periods;
communicating, by each of the multiple processors and over a computer network, one or more of the cost values determined by the processor; and
communicating, by each of the multiple processors, additional cost values representing the extent to which the respective words match the portions of the utterance only after a predetermined amount of time comprising multiple of the future time periods has elapsed.

* * * * *